United States Patent

[11] 3,629,958

| [72] | Inventors | Jack R. Olson<br>San Diego;<br>Henry M. Miller, Jr., Lakeside, both of Calif. |
|---|---|---|
| [21] | Appl. No. | 804,866 |
| [22] | Filed | Mar. 6, 1969 |
| [45] | Patented | Dec. 28, 1971 |
| [73] | Assignee | The United States of America as represented by the Secretary of the Navy |

[54] INTERNAL AND SURFACE WAVE SIMULATOR TANK
5 Claims, 3 Drawing Figs.

[52] U.S. Cl. ........................................................ 35/19,
40/106.21, 73/170
[51] Int. Cl. .......................................................... G09b 23/12
[50] Field of Search .......................................... 35/18, 19;
40/106.21, 126; 73/148, 170 A; 272/8

[56] References Cited
UNITED STATES PATENTS

| 2,394,093 | 2/1946 | Nalle | 35/19 X |
| 2,814,895 | 12/1957 | Flam | 40/126 |
| 3,187,459 | 6/1965 | Glass | 272/8 X |
| 3,478,444 | 11/1969 | Presnell | 35/19 |

FOREIGN PATENTS

| 419,992 | 11/1934 | Great Britain | 40/106.21 |

*Primary Examiner*—Harland S. Skogquist
*Attorneys*—Justin P. Dunlavey, Ervin F. Johnston and Thomas G. Keough ABSTRACT: A rectangularly shaped tank having at least one transparent wall is partially filled with fluids having discrete specific gravities to ensure a stratified separation of the fluids within the tank. A visual observation of this separation is aided by dyeing the fluids different colors. A reciprocating vane or bellows is suspended in the liquid and, via an appropriate driving mechanism, is reciprocated at various frequencies and magnitudes imparting an internal wave motion to the layered fluids to simulate oceanographic internal waves found in the strata of the ocean as determined by volumes of water having distinct salinities, temperatures, or currents, etc. A variable-speed fan disposed in a recirculating-air system impels air onto the exposed upper surface of the fluids simulating wind conditions and their creation of various surface waves. High-frequency sonar or optical beam forming and receiving device transducers are optionally mounted at opposite ends of the tanks in the separate layers to transmit and receive signals through the layers and thus provide, through appropriate monitoring circuitry and devices, an indication of the effects of surface and internal wave action on the signals.

INVENTORS
JACK R. OLSON
HENRY M. MILLER, JR.
BY
Thomas G. Keough
Ervin F. Johnston
ATTORNEYS

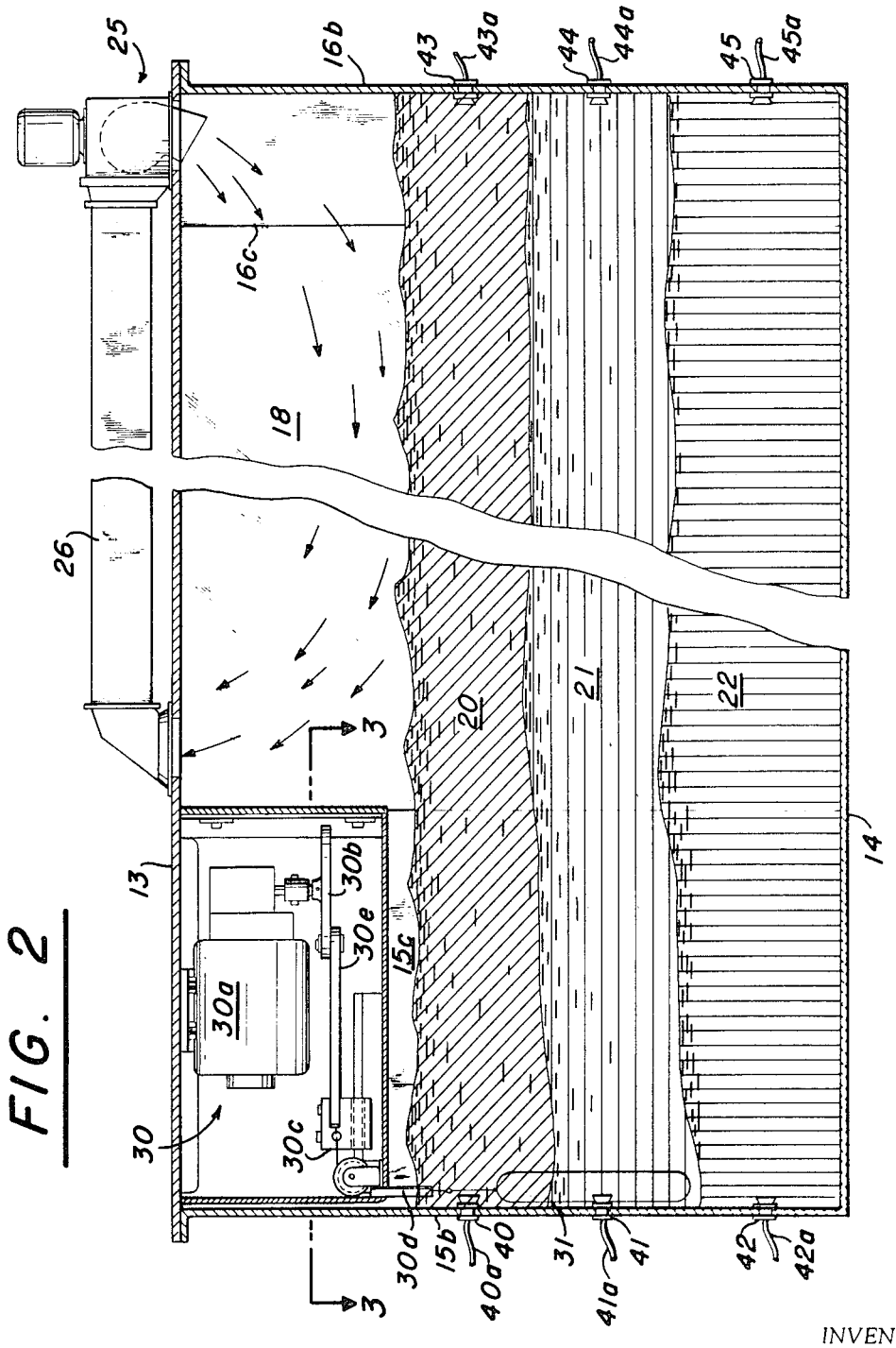

INTERNAL AND SURFACE WAVE SIMULATOR TANK

STATEMENT OF GOVERNMENT INTEREST

The invention described herein may be manufactured and used by or for the Government of the United States of America for governmental purposes without the payment of any royalties thereon or thereon or therefor.

BACKGROUND OF THE INVENTION

Considerable research involving the scaled representation of a body of water and how it is affected by surface winds has been done. Also, the study of the internal wave phenomenon as been advocated using a standard water tanklike arrangement with pressure-responsive transducers at opposite ends giving some indication of the characteristics of transmitted internal waves. However, the interaction between ocean strata established by varying temperature, salinity, currents, etc., has escaped visual observation since the separation between such layer in the ocean cannot readily be observed. Within the field of the present invention, a need exists for a device that simulates and presents a cross-sectional representation of the ocean and the inner reactions caused by surface and internal waves with respect to acoustic energy transmitted therethrough. In addition to being a research tool, such an invention can be employed as a training device for giving sonar operators experience regarding signal transmission through the stratified ocean as it is subjected to internal separation and action.

SUMMARY OF THE invention

The invention is directed to providing a representation of the effects upon fluid strata attributed to surface and internal waves and concerning the transmission of sonar energy therethrough. A plurality of liquids each having a discrete specific gravity is arranged in a strata. A container holding the fluids is provided with a transparent side permitting observation of any interactions resulting as a reciprocating vane creates internal waves and a fan causes surface waves. High-frequency sonar transducers or optical beam forming and receiving are optionally placed in different layers at opposite ends of the container to transmit and to receive signals through fluids, and appropriate monitoring circuitry, e.g., oscilloscopes, meters, or similar devices, provide a visual indication of the effects of surface and internal waves on the transmitted signals.

BRIEF DESCRIPTION OF THE DRAWINGS

FIG. 2 shows a sectional view generally taken along lines 2—2 in FIG. 1;

PREFERRED EMBODIMENT OF THE INVENTION

Figure 1:
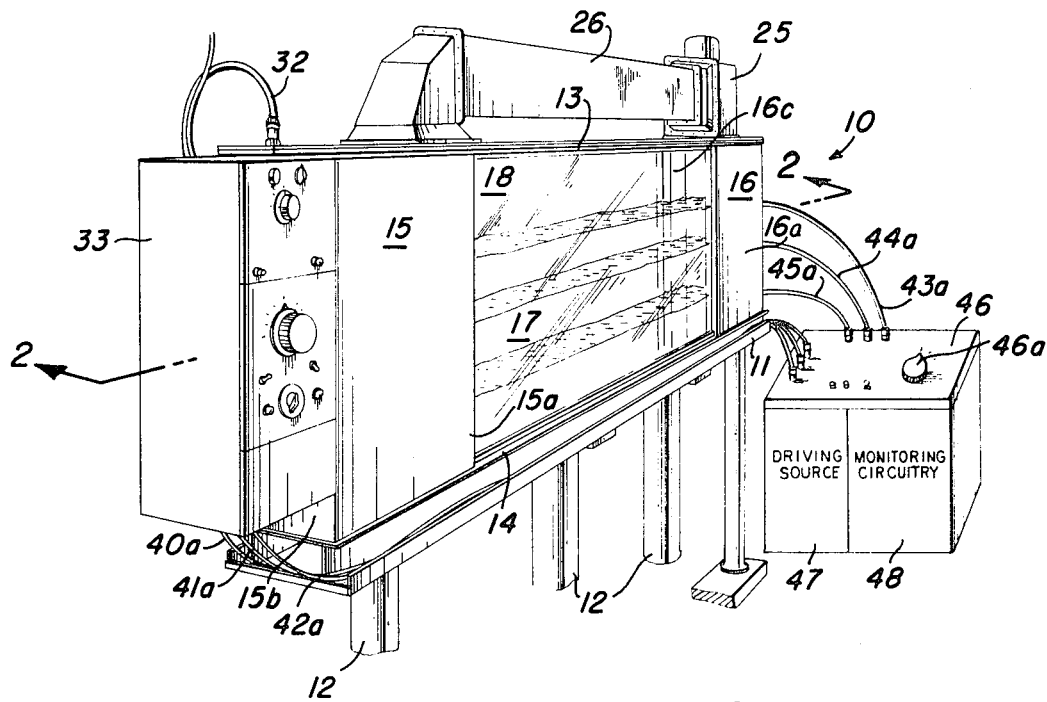
FIG. 1 is a perspective view of the invention.
Figure 3:
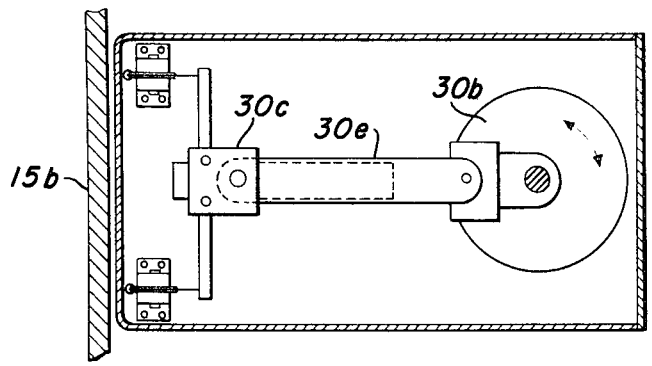
FIG. 3 is a sectional representation of a detail generally taken along lines 3—3 in FIG. 2.

Referring now to FIG. 1, an internal and surface wave simulator tank 10 is carried on a bed 11 supported by a plurality of legs 12. The tank is formed from a top plate 13 and a bottom plate 14 separated and secured to U-shaped member 15 formed of sections 15a, 15b, and 15c and a U-shaped member formed of sections 16a, 16b, and 16c. A front and a back viewing window 17 and 18, constructed of a heavy-duty pressure-resistant transparent plate material, extends between the members and is secured and sealed along their lines of juncture. By welding the lines of connections between the plates and the sections or applying a sealant to these lines, a leakproof container is provided for retaining liquids representative of the ocean's cross-sectional strata.

Commonly, the ocean is not uniform as to, for example, temperature, salinity, or current, etc., but differs in makeup as to some physical or chemical quality.

Water temperature is not constant throughout, but generally decreases with depth in layers having boundaries capable of being felt by a driver in a 2- to 3-foot transition. Similarly, in some cases salinity changes with depth in definite layers having measurable boundaries. Also, undersea currents are capable of being separate and distinct in much the same manner as the well-known atmospheric jetstream is separate and distinct from surrounding air turbulence.

Filling a tank 10 with fluids 20, 21, and 22, each having a discrete specific gravity, simulates a cross section of the ocean strata. In the instant invention, top layer fluid 20 is diiso butyl adipate having a specific gravity of 0.953. Middle fluid layer 21 is a water and formaldehyde solution having a specific gravity of 1.00 and the bottom fluid layer 22 is dimethyl phthalate having a specific gravity of 1.19. Since the fluids have these specific gravities and the chemical compositions, the layers do not tend to mix and retain their laminate relationship.

Surface waves are usually caused by wind and may be represented in the present tank. By providing a variable-speed motor-fan apparatus 25 that impels air over the surface of fluid 20 and returns it for recirculation via a return duct 26, surface waves representative of winds are produced. In addition, the apparatus is capable of being periodically actuated to produce intermittent surface waves.

Internal waves are produced by a reciprocating vane or plunger 31 that depends from a reciprocating mechanism 30 having a drive motor 30a connected to a crank assembly 30b. The vane is sized to produce internal waves when displaced. A follower 30c joined to the plunger via a line 30d, reciprocates in accordance with the motion transferred by push rod 30e from the crank. A pair of control leads 32 extending from motor 30a, terminates in a control box 33.

The control box contains a motor speed control which varies the frequency of vane 31 through the crank assembly and additionally includes circuitry that controls the motor-fan apparatus as to magnitude and time duration. In this way, internal waves occurring within the ocean strata are represented in the wave simulator tank although these artificially created internal waves are perhaps not identical to natural internal waves, believed to be produced by intense atmospheric conditions, earthquakes, or similar phenomena of nature. However, these simulated internal waves produce a model of layer interaction and their effect on communications in the ocean.

A plurality of high-frequency sonar or optical transceiver transducers 40, 41, 42, 43, 44, and 45 are disposed to acoustically communicate through the top, middle, and lower fluid levels and are joined to respectively associated connecting leads 40a, 41a, 42a, 43a, 44a, and 45a to a terminal selector board 46. A selector switch 46a connects respective ones of the connecting leads to an acoustic driving source 47 when particular ones of the transducers are used as projectors. When particular ones of the transducers are used as receivers, the selector switch is changed to connect the transducers to visual or electronic monitoring circuitry 48 permitting an evaluation of the transmitted signals. Since traditional driving sources and means for monitoring a signal are well known in the art, inclusion of representative circuit diagrams and embodiments are eliminated for the sake of simplicity.

Obviously many modifications and variations of the present invention are possible in the light of the above teachings and it is therefore to be understood that within the scope of the disclosed inventive concept, the invention may be practiced otherwise than as specifically described.

In the claims:

1. An apparatus for providing a visual representation of the interaction between levels of liquid strata comprising:

a plurality of liquids each having a discrete density arranged in layers;

a container having a first portion defining an enclosed airspace adjacent and above the top one of said liquids and a second portion shaped to maintain said layers;

means for impelling air through said airspace onto said top one being disposed in said airspace;

means for displacing said liquids being immersed for reciprocal travel therein; and means for permitting a visual observation of said interaction between levels caused by the simultaneously actuated air-impelling means and the reciprocable displacing means.

2. An apparatus according to claim 1 further including:
actuating means joined to the displacement means for imparting displacements of said layers according to selectively different magnitudes.

3. An apparatus according to claim 2 in which said container is a rectangular tank and said observation means is at least one transparent wall of said tank.

4. An apparatus according to claim 3 in which said displacement means is a motor-driven reciprocating apparatus joined to a reciprocating vane suspended in contact with at least one of said layers.

5. An apparatus according to claim 4 further including:
a duct joined at opposite ends to said first portion defining said enclosed air space for recirculating said impelled air onto said surface, and in which the impelling means is a motor-driven fan.

* * * * *